(12) United States Patent
Senda et al.

(10) Patent No.: US 9,819,052 B2
(45) Date of Patent: Nov. 14, 2017

(54) ELECTROLYTE AND SECONDARY BATTERY

(75) Inventors: Yui Senda, Kanagawa (JP); Kenta Yamamoto, Kanagawa (JP); Yuri Nakayama, Kanagawa (JP); Reina Ito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 713 days.

(21) Appl. No.: 13/264,641

(22) PCT Filed: Apr. 9, 2010

(86) PCT No.: PCT/JP2010/056423
§ 371 (c)(1),
(2), (4) Date: Oct. 14, 2011

(87) PCT Pub. No.: WO2010/122909
PCT Pub. Date: Oct. 28, 2010

(65) Prior Publication Data
US 2012/0034531 A1 Feb. 9, 2012

(30) Foreign Application Priority Data
Apr. 23, 2009 (JP) ................... 2009-105335

(51) Int. Cl.
*H01M 10/054* (2010.01)
*H01B 1/12* (2006.01)
(Continued)

(52) U.S. Cl.
CPC .......... *H01M 10/054* (2013.01); *H01B 1/122* (2013.01); *H01M 10/0568* (2013.01);
(Continued)

(58) Field of Classification Search
None
See application file for complete search history.

(56) References Cited

U.S. PATENT DOCUMENTS 4,690,877 A    9/1987 Gabano
4,963,616 A *  10/1990 Jenekhe .................. C08G 61/12
                                                          252/500

(Continued)

FOREIGN PATENT DOCUMENTS

CN    1411086     4/2003
JP    61-176074   8/1986
(Continued)

OTHER PUBLICATIONS

International Search Report dated Jun. 29, 2011.
(Continued)

*Primary Examiner* — Wyatt McConnell
(74) *Attorney, Agent, or Firm* — Dentons US LLP

(57) ABSTRACT

A secondary battery capable of safely improving a battery performance is provided. An electrolyte with which a separator 13 is impregnated contains an alkyl sulfone and a low-polar solvent (a solvent having a relative permittivity of 20 or less) together with an aluminum salt. The alkyl sulfone facilitates the redox reaction of aluminum, and further reduces the reactivity of the electrolyte. Additionally, the low-polar solvent suppresses the block of the redox reaction of aluminum. In charge and discharge, it becomes easy to electrochemically efficiently precipitate and dissolve aluminum, and further to inhibit the corrosion of a metallic exterior package member or the like.

12 Claims, 2 Drawing Sheets

(51) Int. Cl.
*H01M 10/0568* (2010.01)
*H01M 10/0569* (2010.01)
*H01M 4/38* (2006.01)
*H01M 4/46* (2006.01)

(52) U.S. Cl.
CPC .......... *H01M 10/0569* (2013.01); *H01M 4/38* (2013.01); *H01M 4/463* (2013.01); *H01M 2300/0037* (2013.01)

(56) References Cited

U.S. PATENT DOCUMENTS

| | | | |
|---|---|---|---|
| 2003/0059684 A1 | 3/2003 | Takami et al. | |
| 2003/0190529 A1* | 10/2003 | Kim .................... | H01M 10/052 429/307 |
| 2004/0214091 A1 | 10/2004 | Lim et al. | |
| 2004/0259002 A1 | 12/2004 | Kim et al. | |

FOREIGN PATENT DOCUMENTS

| | | |
|---|---|---|
| JP | 03-238769 | 10/1991 |
| JP | H06-52898 A | 2/1994 |
| JP | 06-293991 | 10/1994 |
| JP | 09-120816 | 5/1997 |
| JP | 09-259892 | 10/1997 |
| JP | 2003-100347 | 4/2003 |
| JP | 20030297423 | 10/2003 |
| JP | 2004-311442 | 11/2004 |
| JP | 2004-327445 | 11/2004 |
| JP | 2007-172969 | 7/2007 |

OTHER PUBLICATIONS

Japanese Office Action issued in connection with related Japanese Patent Application No. JP 2009-105335 dated Aug. 6, 2013.
Chinese Office Action issued in connection with related Chinese Patent Application No. CN 2010-80016667.0 dated Aug. 29, 2013.
Supplementary Extended European Search Report issued in connection with related EP application No. EP 10 766967 dated Jul. 30, 2014.

* cited by examiner

ELECTROLYTE AND SECONDARY BATTERY

TECHNICAL FIELD

The present invention relates to an electrolyte containing an aluminum salt and a solvent, and a secondary battery using the same.

BACKGROUND ART

Recently, portable electronic devices such as camcorders, digital still cameras, mobile phones, and notebook computers have been widely used, and it is strongly demanded to reduce the size and weight, and long-life operation in these devices. Therefore, a battery, particularly a secondary battery having small size and light weight and capable of obtaining high energy density has been developed as a power source.

As such a secondary battery, an aluminum secondary battery utilizing precipitation and dissolution of aluminum for charge-discharge reaction is attracting attention. Because aluminum has a relative higher tendency to become ionic, and thus has large quantities of electricity per unit volume obtained due to redox reaction. Accordingly, aluminum is a very promising material as a material forming an electrode or as an electronic charge carrier.

An aluminum secondary battery has an electrolyte containing an aluminum salt and a solvent together with a cathode and an anode. An electrolyte composition functioning as a medium for charge-discharge reaction highly influences a battery performance, and thus has been variously studied.

Specifically, in order to achieve high capacity and long-life operating, alkyl sulfones such as dimethyl sulfone (see, for example, the patent literature 1) are used. In this case, an organic solvent such as a cyclic carbonate, a chain carbonate, a cyclic ether, or a chain ether is used.

Moreover, in order to reduce polarization in discharge, an organohalogen compound such as trimethylphenylammonium chloride is used together with an aluminum salt such as aluminum chloride (see, for example, the patent literatures 2 and 3). In this case, an organic solvent such as 1,2-dichloroethane is used.

CITATION LIST

Patent Literature

Patent Literature 1: Japanese Unexamined Patent Application Publication No. 2003-100347
Patent Literature 2: Japanese Unexamined Patent Application Publication No. Hei06-293991
Patent Literature 3: Japanese Unexamined Patent Application Publication No. Hei09-259892

SUMMARY OF INVENTION

For improving the battery performance of an aluminum secondary battery, there is a need to obtain as large battery capacity as possible. However, in an existing aluminum secondary battery, it is difficult to efficiently precipitate and dissolve aluminum electrochemically during charge and discharge. Accordingly, a sufficient battery capacity is not necessarily obtained. Additionally, there is a disadvantage that a metallic exterior package member such as a battery can is easily corroded during charge and discharge. Therefore, in addition to the battery performance, the safety of the aluminum secondary battery leaves much to be improved.

This present invention, conceived to address the such disadvantages, has an objective to provide an electrolyte capable of improving safely the battery performance and a secondary battery using the same.

An electrolyte according to an embodiment of the present invention contains an aluminum salt, an alkyl sulfone (R1—S($=$O)$_2$—R2, where R1 and R2 represent alkyl groups), and a solvent having a relative permittivity of 20 or less. Further, a secondary battery according to the embodiment of the present invention has an electrolyte together with a cathode and an anode, and the electrolyte has the compositions described above. Note that the value of the relative permittivity is a measured value at 25° C.

In the electrolyte according to the embodiment of the present invention, the alkyl sulfone and the solvent with relative permittivity of 20 or less are contained together with the aluminum salt. In this case, with the inclusion of the alkyl sulfone, the redox reaction of aluminum easily proceeds, and the reactivity of the electrolyte reduces. Further, the inclusion of the solvent allows the redox reaction of aluminum to be scarcely blocked. Therefore, as well as facilitating efficient electrochemical precipitation/dissolution of aluminum, the inclusion inhibits corrosion of metallic materials used together with the electrolyte. Accordingly, in the secondary battery using the electrolyte according to an embodiment of the present invention, damage to a metallic exterior package member may be suppressed, and additionally, the large battery capacity is obtained in the secondary battery. Therefore, the battery performance may be safely improved.

DESCRIPTION OF EMBODIMENTS

Figure 1:
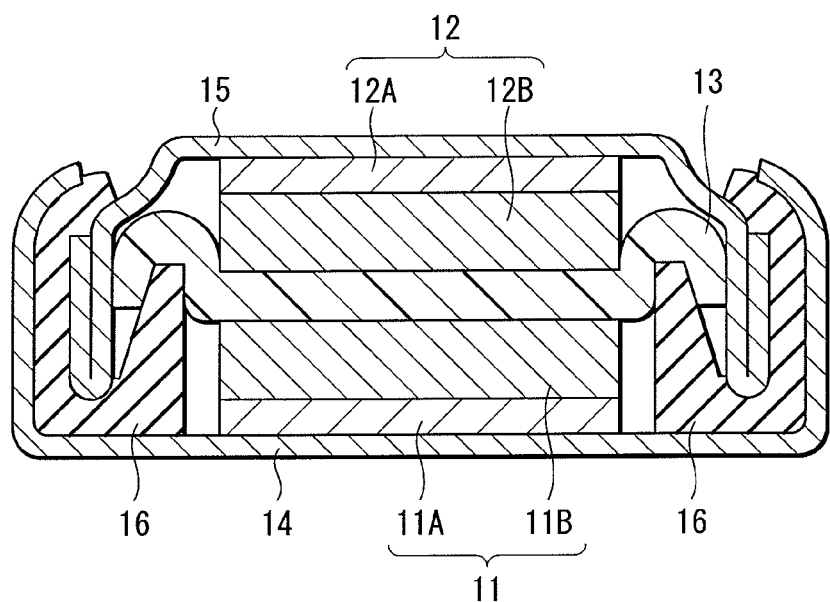
FIG. 1 is a cross-sectional view illustrating a structure of a secondary battery with an electrolyte according to an embodiment of the present invention.

Embodiments of present invention will be discussed below in detail with reference to drawings. Note that the order of discussion is as follows.

1. Electrolyte
2. Electrochemical Device Using an Electrolyte (Secondary Battery)

<1. Electrolyte>

An electrolyte according to an embodiment of the present invention is used for an electrochemical device such as, for example, an aluminum secondary battery, and has a state that an electrolyte salt and an alkyl sulfone are dispersed (dissolved) in a solvent. However, the electrolyte may contain other materials except for the above materials.

[Electrolyte Salt]

The electrolyte salt includes one kind or two or more kind of any of aluminum salts. However, the electrolyte salt may contain other salts except for the aluminum salt together with the aluminum salt.

The aluminum salt contains an aluminum ion ($Al^{3+}$) as a cation (positive ion) and an anion (negative ion). Examples of the anion include fluoride ion ($F^-$), chloride ion ($Cl^-$), iodide ion ($I^-$), bromide ion ($Br^-$), perchlorate ion ($ClO_4^-$), tetrafluoroborate ion ($BF_4^-$), hexafluorophosphate ion ($PF_6^-$), hexafluoroarsenate ion ($AsF_6^-$), perfluoroalkylsulfonate ion ($RfSO_3^-$, where Rf represents a perfluoroalkyl group.), or perfluoroalkylsulfonylimide ion ($(RfSO_2)_2N^-$). However, the anion may be other ions except for the above ions.

The aluminum salt may be a complex salt. Examples of a cation in this case include $[Al(CH_3CN)_6]^{3+}$ in which acetonitrile coordinates with aluminum ion and $[Al(DMSO)_6]^{3+}$ in which dimethylsulfoxide (DMSO: $(CH_3)_2SO$) coordinates with aluminum ion. However, the cation contained in the complex salt may be other cations except for the above cation.

Specific examples of the aluminum salt include aluminum halide ($AlX_3$: where X represents chlorine (Cl), bromine (Br), or iodine (I).).

The content of the aluminum salt in the electrolyte is preferably, but not limited to, equal to or less than 10% by weight and equal to or more than 60% by weight. With this content, an electrode reaction may sufficiently proceed through the electrolyte in an electrochemical device.

[Alkyl Sulfone]

Alkyl sulfone is chain compound represented by R1—S($=O)_2$—R2. Both of R1 and R2 represent alkyl groups, which may be the same type or different types. The alkyl sulfone may include one kind or two or more kinds of alkyl sulfones.

The alkyl sulfone is contained in the electrolyte due to the following two reasons. The first reason is that the alkyl sulfone facilitates solvation of the aluminum salt, and thereby aluminum becomes electrochemically active. Accordingly, the redox reaction of aluminum proceeds easily. The second reason is that the alkyl sulfone suppresses oxidizing property of the electrolyte (the property oxidizing the others except for the electrolyte), and thereby the reactivity reduces. Accordingly, when the electrolyte is used for an electrochemical device together with a metallic material, the metallic material may be resistant to corrosion. The metallic material refers to, for example, a metallic exterior package member, an electrode, a conductive wire, or the like.

Types of R1 and R2 preferably have structures in which, but not limited to, carbon number is 4 or less, respectively. This is because good solubility and compatibility are obtained. Examples of such R1 and R2 include a methyl, ethyl, n-propyl, i-propyl, n-butyl, i-butyl, s-butyl, or t-butyl group. In particular, the total carbon number of R1 and R2 is preferably not less than 4 and not more than 7. With the total number, a higher effect is obtained.

Specific examples of the alkyl sulfone include ethyl-n-propyl sulfone, ethyl-i-propyl sulfone, ethyl-n-butyl sulfone, ethyl-i-butyl sulfone, ethyl-s-butyl sulfone, or di-n-propyl sulfone.

The content of the alkyl sulfone in the electrolyte is preferably, but not limited to, equal to or less than 10% by weight and equal to or more than 80% by weight. This is because the aluminum salt may be sufficiently solvated.

[Solvent]

The solvent contains one kind or two or more kinds of non-aqueous solvent(s) (hereinafter simply referred to as "low-polar solvent".) having a relative permittivity of 20 or less. Since the low-polar solvent(s) has(have) little influence on the solvation of the aluminum salt, in addition to suppressing the block of the solvation of the aluminum salt, the aluminum salt and the alkyl sulfone may be dispersed. Additionally, since the low-polar solvent(s) allows low-viscosity of the electrolyte, the aluminum salt and the alkyl sulfone may be easily diluted. Note that the solvent may contain other non-aqueous solvents together with the low-polar solvents.

The low-polar solvent is a low-dielectric and aprotic (low-electron donating) solvent. Note that the value of the relative permittivity is a measured value at 25° C.

Within the range of the relative permittivity described above, examples of the low-polar solvent type include, but not limited to, aromatic hydrocarbon, ethers, ketones, acetate esters, chain carbonate esters, halides thereof, or the like. Examples of the aromatic hydrocarbon, which is an aromatic ring or a compound having a hydrocarbon group to be introduced into the aromatic hydrocarbon ring, include benzene, toluene, ethyl benzene, o-xylene, m-xylene, p-xylene, 1-methylnaphthalene, or the like. Examples of ethers include diethyl ether, tetrahydrofurane, or the like. Examples of ketones include 4-methyl-2-pentanone, or the like. Examples of acetate esters include methyl acetate, ethyl acetate, or the like. Examples of chain carbonate esters include dimethyl carbonate, diethyl carbonate, ethyl methyl carbonate, or the like. Halide, in which at least some of hydrogens in the aromatic hydrocarbon or the like described above is substituted with halogen, includes, for example, fluoride or the like. Besides this, other types of esters and the like are included.

In particular, a low-polar solvent capable of dissolving sufficiently the aluminum salt and the alkyl sulfone is preferable. The aluminum salt and the alkyl sulfone are uniformly dispersed by the solvent, and thereby a higher effect is obtained. Note that, when determining solubility of each solvent, for example, the mixing ratio among the aluminum salt, the alkyl sulfone, and the low-polar solvent is set to 10:60:30 by weight ratio.

Additionally, a low-polar solvent having the relative permittivity of 10 or less is preferable, and of 2.4 or less is more preferable. The low-polar solvent with the relative permittivity of 10 or less is, for example, aromatic hydrocarbons, a chain carbonate esters, or the like, and the solvent with the relative permittivity of 2.4 or less is, for example, aromatic hydrocarbons, or the like.

The content of the low-polar solvent in the electrolyte is preferably, but not limited to, equal to or more than 5% by weight and equal to or less than 80% by weight. This is because content of the low-polar solvent allows that the aluminum salt and the alkyl sulfone are dispersed without blocking the salvation of the aluminum salt.

In this electrolyte, the alkyl sulfone and the low-polar solvent are contained together with the aluminum salt. In this case, in addition to electrochemical activation of aluminum, the reactivity (oxidizing property) of the electrolyte is inhibited, compared to the electrolyte without the alkyl sulfone. Accordingly, the redox reaction of the aluminum becomes to proceed easily, and further the metallic materials become resistant to corrosion due to the electrolyte. Additionally, since the low-polar solvent scarcely influence the redox reaction of the aluminum, the redox reaction of the aluminum becomes to be scarcely blocked. Accordingly, when the electrolyte is used for electrochemical devices, it is capable that the aluminum is efficiently precipitated and dissolved electrochemically, and further the corrosion of the metallic materials may be suppressed.

In particular, when the low-polar solvent is an aromatic hydrocarbon such as toluene, the redox reaction of the aluminum becomes more less likely to be blocked, and thus a higher effect can be obtained.

<2. Electrochemical Devices Using Electrolyte (Secondary Battery)>

Next, examples of using the electrolyte described above will be discussed. Herein, when a secondary battery is cited as an example of an electrochemical device, the electrolyte is used for the secondary battery in the following manner.

FIG. 1 shows a cross sectional structure of a secondary battery. The secondary battery discussed herein is an aluminum secondary battery in which the capacity is represented by the precipitation and dissolution of the aluminum ions in charge and discharge.

In this secondary battery, a package can 14 including a cathode 11 and a package cup 15 including an anode 12 are caulked with a separator 13 and a gasket 16.

The package can 14 and the package cup 15 are package members for including the cathode 11, the anode 12 and the like, and are formed of metallic materials such as aluminum (Al), aluminum alloys, and stainless.

The cathode 11 has a structure in which, for example, a cathode active material layer 11B is provided on a single face of the cathode current collector 11A. The cathode current collector 11A is formed of, for example, aluminum, nickel (Ni), stainless, or the like. The cathode active material layer 11B contains other materials such as a cathode binder and a cathode electrical conductor together with the cathode active material as needed. The cathode active material is, for example, disulfide such as titanium disulfide, or molybdenum sulfide. The cathode binder is, for example, a polymer material such as polyvinylidene fluoride, or polytetrafluoroethylene. The cathode electrical conductor is a carbon material such as graphite, carbon black, acetylene black, or Ketjen Black.

The anode 12 has a structure in which, for example, an anode active material layer 12B is provided on a single face of an anode current collector 12A. The anode collector 12A is formed of, for example, copper (Cu), nickel, stainless, or the like. The anode active material layer 12B is formed of aluminum or aluminum alloys. The aluminum alloys are composed of at least one kind of elements, for example, silicon (Si), manganese (Mn), chrome (Cr), nickel, and copper.

The separator 13 separates the cathode 11 and the anode 12 to prevent short-circuit caused by contact between both electrodes, and thereby allowing passage of aluminum ions. The separator 13 is formed of, for example, a porous membrane composed of synthetic resins, ceramics, or the like. Examples of a synthetic resin include polytetrafluoroethylene, polypropylene, polyethylene, or the like. However, the separator 13 may be formed by stacking two or more kinds of porous membranes. The separator 13 is impregnated with the above electrolyte. The electrolyte is a so-called electrolytic solution (a liquid electrolyte).

In the secondary battery, for example, charge-discharge reaction occurs as follows. In charge, aluminum ions are released from the cathode 11 followed by reaching the anode 12 through the electrolyte with which the separator 13 is impregnated, and thereby the reduction reaction occurs. In contrast, in discharge, aluminum ions are eluted from the anode 12 into the electrolyte due to the oxidation reaction.

In the secondary battery, with the electrolyte described above, damage to the package can 14 and the package cup 15 in charge and discharge may be suppressed, and further large battery capacity is obtained. Accordingly, the battery performance may be safely improved.

EXAMPLES

Next, Examples of the present invention will be discussed in detail.

Experimental Examples 1-1 to 1-20

As shown in Table 1, liquid electrolytes, i.e. electrolytic solutions were respectively prepared by mixing aluminum salts, alkyl sulfones, and solvents in a predetermined ratio by weight. In this case, aluminum chloride ($AlCl_3$) was used as an aluminum salt. As an alkyl sulfone, ethyl-n-propyl sulfone (ENPS), ethyl-i-propyl sulfone (EIPS), ethyl-n-butyl sulfone (ENBS), ethyl-i-butyl sulfone (EIBS), ethyl-s-butyl sulfone (ESBS), or di-n-propyl sulfone (DNPS) was used. As a solvent, benzene (BEZ), o-xylene (OXY), m-xylene (MXY), p-xylene (PXY), 1-methyl-naphthalene (MN), γ-butyrolactone (GBL), or propylene carbonate (PC) was used.

Figure 2:
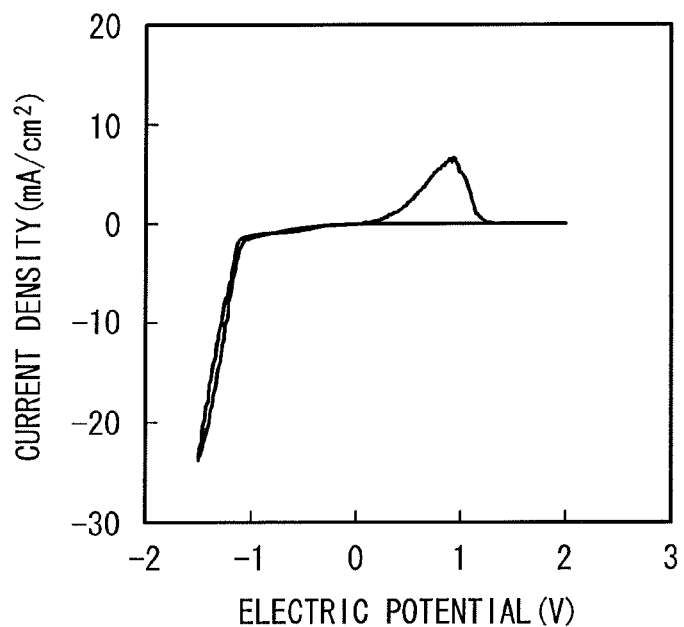
FIG. 2 is measurement results of the cyclic voltammetry (Experimental examples 1-6).
Figure 3:
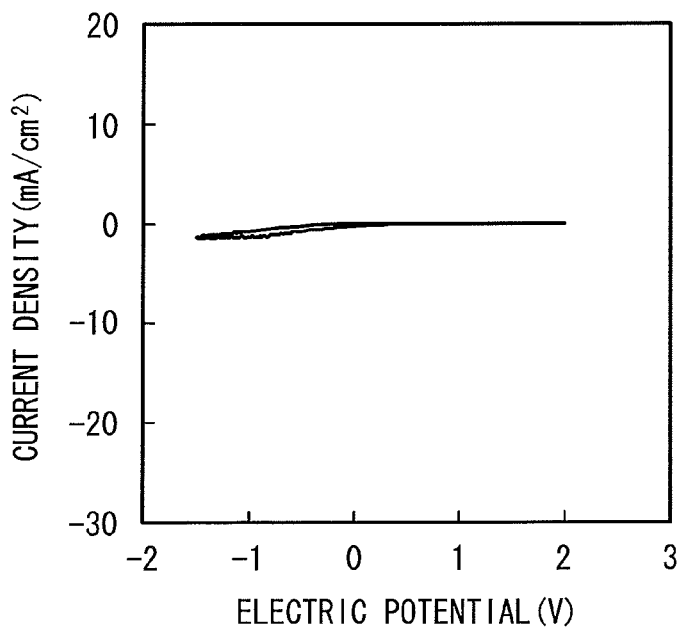
FIG. 3 is measurement results of the cyclic voltammetry (Experimental examples 1-19).

The electrochemical properties of the electrolytic solutions according to the Experimental examples 1-1 to 1-20 were tested, and thus the results shown in Table 1 were obtained. In these experimental examples, with the use of electrolytic solution with 2 $cm^3$, the current flowing in the redox reaction of aluminum was measured in thermostatic chamber at 60° C. by cyclic voltammetry (three-electrode cell). In this case, a side covering molybdenum electrode (diameter: 1.5 mm) manufactured by BAS Inc. was used as a working electrode, and further an aluminum wire (diameter: 1.0 mm) manufactured by Nilaco Corporation was used as a reference electrode and a counter electrode. Moreover, the potential (V) of the working electrode with respect to the potential (V) of the reference electrode was varied within the range between −1.5 V and 2 V at a sweep rate of 10 mV/s. Based on these measurement results, the determination was performed as follows. When the value of the current density ($mA/cm^2$) in the oxidation reaction and reduction reaction of aluminum was 3 $mA/cm^2$ or more, the result is expressed by a circle. When the value of the current density thereof was less than 3 $mA/cm^2$, the result is expressed by a cross. Note that the measurement results of the cyclic voltammetry (cyclic voltammogram) for the Experimental examples 1-6 and 1-19 are respectively shown in FIGS. 2 and 3.

TABLE 1

| | Aluminum Salt | | Alkyl Sulfone | | Solvent | | |
|---|---|---|---|---|---|---|---|
| | Type | Content (wt %) | Type | Content (wt %) | Type | Content (wt %) | Determination |
| Experimental example 1 | $AlCl_3$ | 10 | ENPS | 60 | TOL | 30 | ○ |
| Experimental example 2 | | | EIPS | | | | ○ |
| Experimental example 3 | | | ENBS | | | | ○ |

TABLE 1-continued

| | Aluminum Salt | | Alkyl Sulfone | | Solvent | | |
|---|---|---|---|---|---|---|---|
| | Type | Content (wt %) | Type | Content (wt %) | Type | Content (wt %) | Determination |
| Experimental example 4 | | | EIBS | | | | ○ |
| Experimental example 5 | | | ESBS | | | | ○ |
| Experimental example 6 | | | DNPS | | | | ○ |
| Experimental example 7 | AlCl$_3$ | 10 | ENPS | 60 | BEZ | 30 | ○ |
| Experimental example 8 | | | | | OXY | | ○ |
| Experimental example 9 | | | | | MXY | | ○ |
| Experimental example 10 | | | | | PXY | | ○ |
| Experimental example 11 | | | | | MN | | ○ |
| Experimental example 12 | AlCl$_3$ | 10 | ENPS | 85 | TOL | 5 | ○ |
| Experimental example 13 | | 10 | | 50 | | 40 | ○ |
| Experimental example 14 | | 10 | | 30 | | 60 | ○ |
| Experimental example 15 | | 10 | | 10 | | 80 | ○ |
| Experimental example 16 | | 20 | | 60 | | 20 | ○ |
| Experimental example 17 | | 40 | | 40 | | 20 | ○ |
| Experimental example 18 | | 60 | | 20 | | 20 | ○ |
| Experimental example 19 | AlCl$_3$ | 10 | DNPS | 60 | GBL | 30 | X |
| Experimental example 20 | | | | | PC | 30 | X |

In the Experimental examples 1-1 to 1-18 in which the low-polar solvents were used, the redox reaction of aluminum dramatically proceeded near −1 V and 1 V, and thus sufficient value of the current flowed in both of the oxidation reaction of aluminum and the reduction reaction thereof. In contrast, in the Experimental examples 1-19 and 1-20 with no low-polar solvent, the redox reaction of aluminum scarcely proceeded, and further the current scarcely flowed. This result shows that the combination of the alkyl sulfone and the low-polar solvent allows the redox reaction of aluminum to dynamically proceed. Accordingly, aluminum may be efficiently precipitated and dissolved electrochemically as the electrolytic solution contains the alkyl sulfone and the low-polar solvent together with the aluminum salt.

Experimental Examples 1-21

As shown in Table 2, trimethylphenylammonium chloride (TMPAC) and 1,2-dichlorobenzene (DCB) were used instead of DNPS and TOL, respectively. In this case, in the solvent, AlCl$_3$ content was set at 6.7 mol/dm$^3$ (=1), and TMPAC content was set at 3.3 mol/dm$^3$.

In the electrolytic solutions of the Experimental examples 1-6 and 1-21, the reactivity with a metallic material was tested, and thus the results shown in Table 2 were obtained. In these Experimental examples, 20 mg of small pieces made of stainless (SUS430) were immersed with the electrolytic solution for 1 hour at 60° C., and subsequently the weight change rate of the small pieces (%)=[(Weight before immersion−Weight after immersion)/Weight before immersion]×100 was calculated.

TABLE 2

| | Aluminum Salt | Alkyl sulfone | Others | Solvent | Weight Change Rate (%) |
|---|---|---|---|---|---|
| Experimental example 1-6 | AlCl$_3$ | DNPS | — | TOL | 0 |
| Experimental example 1-21 | AlCl$_3$ | — | TMPAC | DCB | 3.0 |

The weight of the small pieces in the Experimental example 1-6 using the alkyl sulfone did not change, while the weight of the small pieces in the Experimental example 1-21 using no alkyl sulfone reduced. This result indicates that use of the alkyl sulfone prevents the small pieces from being dissolved. Based on these, since the electrolyte contains the alkyl sulfone, the corrosion of metallic materials is inhibited.

According to a series of the results described above, by containing the alkyl sulfone and the low-polar solvent together with the aluminum salt, the electrolyte according to the prevent invention may efficiently precipitate and dissolve aluminum electrochemically during suppressing the reactivity to metallic materials.

The present invention has been discussed by citing the embodiment and the examples. However, the present invention is not limited to the aspects discussed in the embodiment and the examples, and thus various modifications may be made in the present invention. For example, the electrolyte of the present invention may be applied to not only a secondary battery but also other electrochemical devices such as a capacitor.

Further, the embodiment and the examples discuss the appropriate range of the relative permittivity of the solvent driven from the results of the examples. However, the discussion does not completely deny the possibility that the value of the relative permittivity is out the range described above. That is, the above appropriate range is a particularly preferred range for obtaining the effect by the present invention, and thus if the effect of the present invention is obtained, the value of the relative permittivity may be somewhat out of the above range.

The invention claimed is:

1. An electrolyte consisting essentially of:
   an aluminum salt;
   an alkyl sulfone represented by a formula R1—S(=O)$_2$—R2, where R1 and R2 represent alkyl groups; and
   a hydrocarbon solvent,
   wherein,
      each carbon number of R1 and R2 in the alkyl sulfone is 4 or less,
      a total carbon number of R1 and R2 is not less than 4 and not more than 7,
      the alkyl sulfone is present in the electrolyte in an amount equal to or less than 10% by weight and equal to or more than 80% by weight,
      the hydrocarbon solvent is ethyl benzene, o-xylene, m-xylene, p-xylene, or 1-methylnaphthalene, and
      the aluminum salt is present in an amount from and including 10 wt % to 60 wt %.

2. The electrolyte according to claim 1, wherein a relative permittivity of the hydrocarbon solvent is 10 or less.

3. The electrolyte according to claim 1, wherein the alkyl sulfone is ethyl-n-propyl sulfone, ethyl-i-propyl sulfone, ethyl-n-butyl sulfone, ethyl-i-butyl sulfone, ethyl-s-butyl sulfone, or di-n-propyl sulfone.

4. The electrolyte according to claim 1 used for a secondary battery.

5. A secondary battery comprising:
   an electrolyte;
   a cathode; and
   an anode,
   wherein,
      (1) the electrolyte consists essentially of (a) an aluminum salt, (b) an alkyl sulfone represented by a formula R1—S(=O)$_2$—R2, where R1 and R2 represent alkyl groups, and (c) a hydrocarbon solvent,
      (2) the hydrocarbon solvent is ethyl benzene, o-xylene, m-xylene, p-xylene, or 1-methylnaphthalene,
      (3) the aluminum salt is present in an amount from and including 10 wt % to 60 wt %,
      (4) each carbon number of R1 and R2 in the alkyl sulfone is 4 or less,
      (5) a total carbon number of R1 and R2 is not less than 4 and not more than 7, and
      (6) the alkyl sulfone is present in the electrolyte in an amount equal to or less than 10% by weight and equal to or more than 80% by weight.

6. The secondary battery according to claim 5, wherein a relative permittivity of the hydrocarbon solvent is 10 or less.

7. The secondary battery according to claim 5, wherein the alkyl sulfone is ethyl-n-propyl sulfone, ethyl-i-propyl sulfone, ethyl-n-butyl sulfone, ethyl-i-butyl sulfone, ethyl-s-butyl sulfone, or di-n-propyl sulfone.

8. A capacitor comprising the electrolyte of claim 1.

9. The electrolyte according to claim 1, wherein the hydrocarbon solvent is present in an amount in a range from and including 5 w t% to 80 wt %, both inclusive.

10. The secondary battery according to claim 5, wherein the hydrocarbon solvent is present in an amount in a range from and including 5 wt % to 80 wt %, both inclusive.

11. The electrolyte according to claim 1, wherein the aluminum salt is aluminum chloride.

12. The secondary battery according to claim 5, wherein the aluminum salt is aluminum chloride.

* * * * *